Aug. 12, 1969 H. H. FINDEISEN 3,460,782

PORTABLE MAGNETIC TAPE RECORDER

Filed Sept. 22, 1966

6 Sheets-Sheet 1

Aug. 12, 1969 H. H. FINDEISEN 3,460,782

PORTABLE MAGNETIC TAPE RECORDER

Filed Sept. 22, 1966 6 Sheets-Sheet 2

Aug. 12, 1969 H. H. FINDEISEN 3,460,782

PORTABLE MAGNETIC TAPE RECORDER

Filed Sept. 22, 1966 6 Sheets-Sheet 3

PORTABLE MAGNETIC TAPE RECORDER

Filed Sept. 22, 1966

6 Sheets-Sheet 4

Aug. 12, 1969 H. H. FINDEISEN 3,460,782

PORTABLE MAGNETIC TAPE RECORDER

Filed Sept. 22, 1966 6 Sheets-Sheet 5

United States Patent Office 3,460,782

Patented Aug. 12, 1969

3,460,782

PORTABLE MAGNETIC TAPE RECORDER

Heinz Helmuth Findeisen, Feltham, England, assignor to Epsylon Research and Development Company Limited, Bedfont, Feltham, England, a British company Filed Sept. 22, 1966, Ser. No. 581,283

Claims priority, application Great Britain, Sept. 27, 1965, 40,959/65, 40,960/65, 40,961/65

Int. Cl. C11b *15/32*

U.S. Cl. 242—198 8 Claims

ABSTRACT OF THE DISCLOSURE

A portable tape recorder built into a container having a hinged lid and containing a mechanism panel with slides which are moved when the lid is closed, the mechanism panel being arranged to accept a cassette containing two tape spools which are automatically engaged when the cassette is pressed into position on the mechanism panel, closure of the lid actuating the slides to cause a pinch roller to engage the tape with the capstan and to move arms with tape guide rollers so that the tape is brought into operative contact with magnetic recording and/or playback heads.

This invention relates generally to magnetic tape recording apparatus, and more particularly to a portable tape recorder which may be used as a computer tape store or memory in conjunction with any of the small and comparatively inexpensive computers which are now appearing on the market, but which also has other uses.

Computers have recently been appearing on the market which are very much smaller and cheaper than the large and powerful computers hitherto known. These small computers have a more restricted range of operation than the large computers but their range of operation is adequate for small organizations which, in any case, cannot affort the large units. The tape recorder according to the invention, being small and compact, is very well adapted for use in conjunction with the small computing units.

Apart from computers, tape recording is being increasingly used for a variety of technical and scientific purposes and the recorder in accordance with the invention, being small and compact, is also very suitable for general use. In addition, the mechanism of the tape recorder is so contrived that it is very simple to operate and needs the absolute minimum of skill.

The invention consists of a magnetic tape recorder comprising a container having a hinged lid, a mechanism panel having means to accept a cassette carrying a pair of tape spools and a quantity of magnetic tape of which a short portion is carried outside the cassette, a pair of hubs on which the tape spools are automatically located when the cassette is placed in position, a spring catch which automatically holds and locates the cassette when it is pressed into position, a capstan and a reversible synchronous motor to drive the capstan, means on the lid engaging a plurality of separate slides which are moved against springs when the lid is opened, a movable pinch roller carried on one of the slides so arranged that when the lid is closed the pinch roller moves the tape outside the cassette into engagement with the capstan, a pair of tape guide arms which carry at least one tape guide roller respectively actuated by the other slides to move the tape into engagement with magnetic heads when the lid is closed, and two motors respectively coupled to the hubs to drive the tape spools.

The cassette for the tape recorder of the invention comprises a casing in the form of a shallow box moulded of synthetic plastics material and a lid to fit the box, circular openings in the bottom of the box and/or the lid to locate spigots on spools for the recording medium, a pair of arms in the cassette which each engage the flange of one spool and hold the spool against movement while the cassette is disengaged from the recorder, the spools being bored to fit over the hubs in the recorder, locating holes in the cassette engageable by locating pins in the recorder, and a hole through the cassette engageable by a spring latch in the recorder when the cassette is placed in position.

The spool mounting arrangement by which each spool in the cassette is engaged with the respective hub in the recorder, comprises the hub in the recorder which as a flange faced with a friction material and a cylindrical portion projecting thereform, at least two spring-loaded pins projecting radially from the cylindrical portion, the spool for the magnetic recording medium having a central portion with a bore to fit on the cylindrical portion of the hub, the bore being flared at its inner end to enable it to pass over the ends of the pins and force them inwardly against their spring loading, the bore also having an internal circumferential recess beyond the flared portion separated from the flared portion by a narrow band of the bore, the recess being of conical form beyond the said narrow band, so that the pins, after passing the said narrow band, move outwardly against the conical portion and force the spool against the facing of friction material on the flange to provide a friction drive for the spool.

One form of tape recorder according to the invention is illustrated, by way of example, in the accompanying drawings in which—

Figure 1:
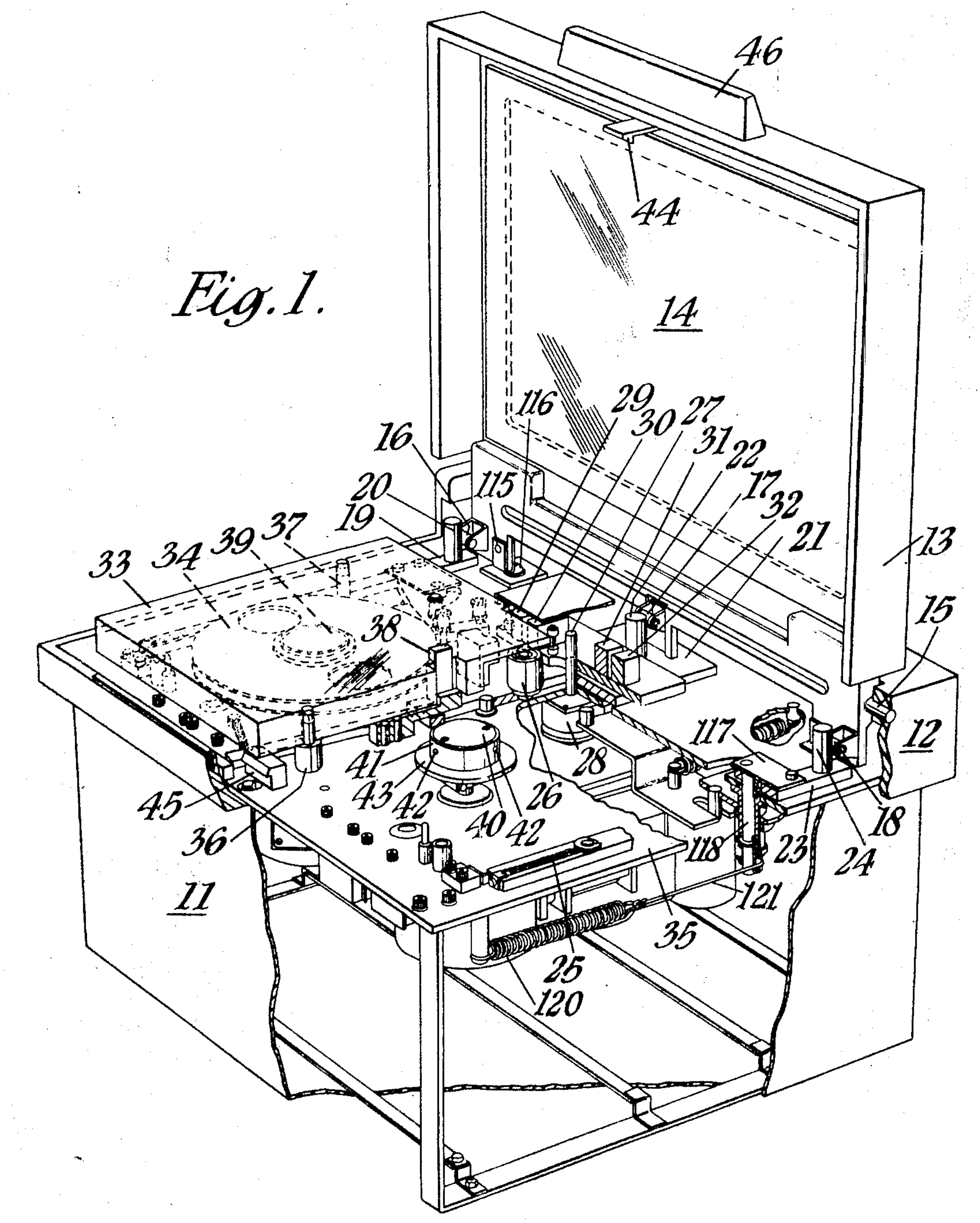
FIGURE 1 is a pictorial view of the recorder with the lid open and parts cut away to show the mechanism.

Referring to FIGURE 1, the recorder includes a container or box 11 which is provided with a plinth 12 into which is hinged a lid 13 having a central glass panel 14. The lid is hinged on a pivot rod 15 and is provided with three brackets, respectively, 16, 17 and 18, each of which carries a roller. The lid is also provided with a nose piece 115 which engages a spring-loaded detent 116 whereby the lid is retained in the open position when desired. Three slides are provided, the first comprising a bar 19 having an upstanding stem 20 near its end which is engaged by the roller on the bracket 16, the second slide being a plate 21 having an upstanding stem 22 which is engaged by the roller on the bracket 17 and the third slide being a bar 23 similar to the bar 19 and having an upstanding stem 24 which is engaged by the roller on the bracket 18. When the lid is opened, the slide 23 is pushed towards the front of the recorder against the tension of a spring 25 and the slides 19 and 21 are similarly moved against springs which are not visible in FIGURE 1. Mounted on the slide 21 is a pinch roller 26 which is spaced from the capstan 27 when the lid is open but which is engaged by the pinch roller when the lid is closed. The capstan 27 is driven by a synchronous motor 28.

Fixed and movable tape guide rollers are provided, the movable rollers 127 and 128 being mounted on guide arms 52 and 53 (FIGURE 2) which are actuated respectively by the slides 19 and 23 so that when the lid is closed the tape is moved into contact with magnetic heads, respectively 29, 30, 31 and 32, arranged in two pairs, one pair being composed of a recording and playback head and being used when recording or playing back with the tape moving in one direction, the other pair consisting also of a recording and a playback head and being used when the tape is being moved in the other direction. The associated fixed guide roller 129 is mounted on a fixed support.

Figure 4:
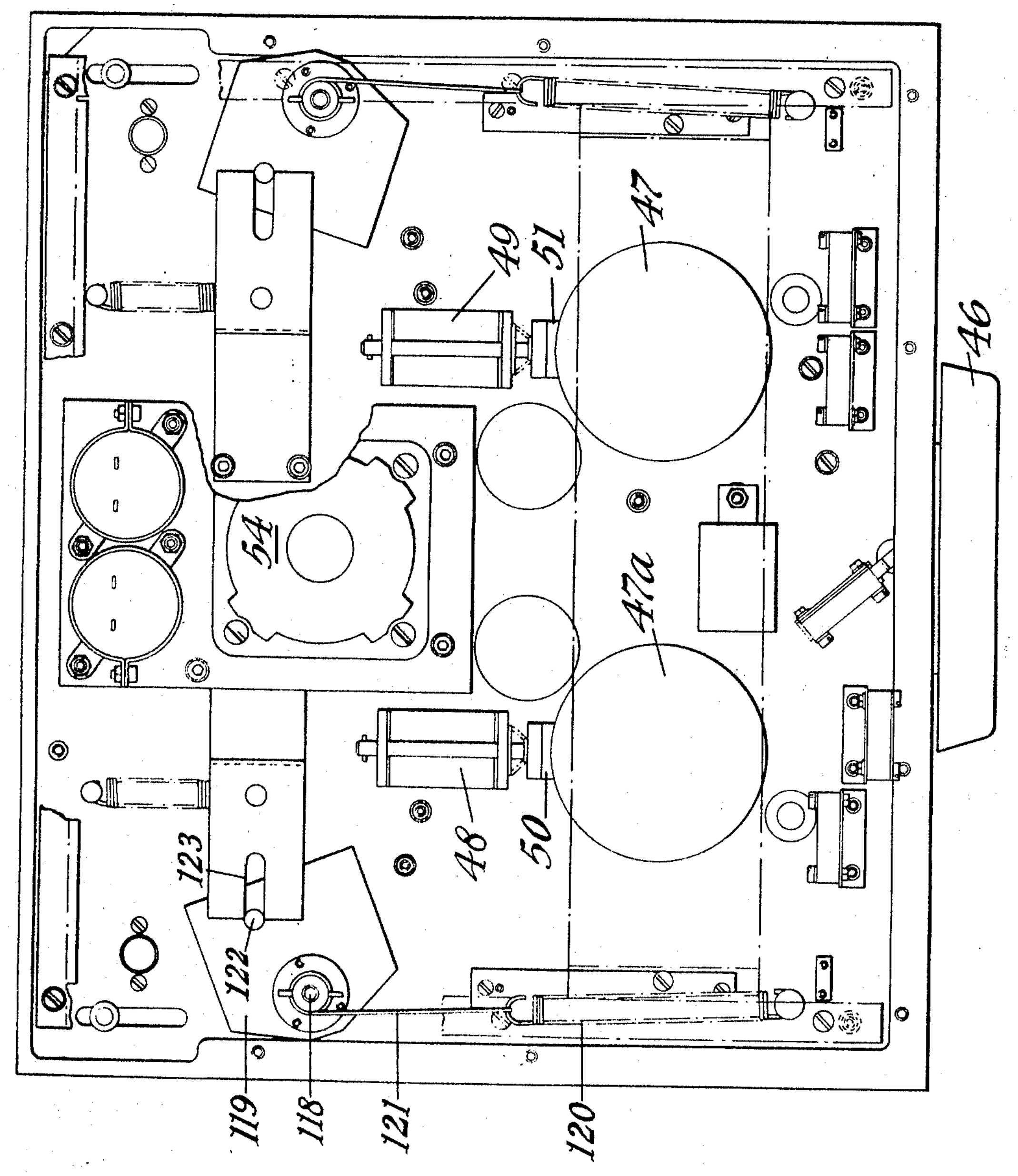
FIGURE 4 is an inverted plan view of the container with the bottom removed.

For movement of the guide arm 53 a bracket 117 (FIGURES 1 and 2) attached to the slide 23 carries a pivot pin 118. A swinging plate 119 (FIGURE 4) carries a bush which is rotatable about the pivot pin 118 and is normally continuously urged to rotate in the anticlockwise direction (as seen in FIGURE 4) by a spring 120, which pulls on a flexible wire or band 121 wound around the bush. The plate 119 is restrained against rotation by the engagement of a pin 122 which it carries with a slot 123 in a fixed plate 124. The spring 120 ensures that there is no free movement or backlash. The guide arm 53 can swing about a fulcrum pin 125 and it carries a pin 126 which engages the swinging plate 119. Similar means are provided to enable the slide 19 to actuate the guide arm 52.

Figure 2:
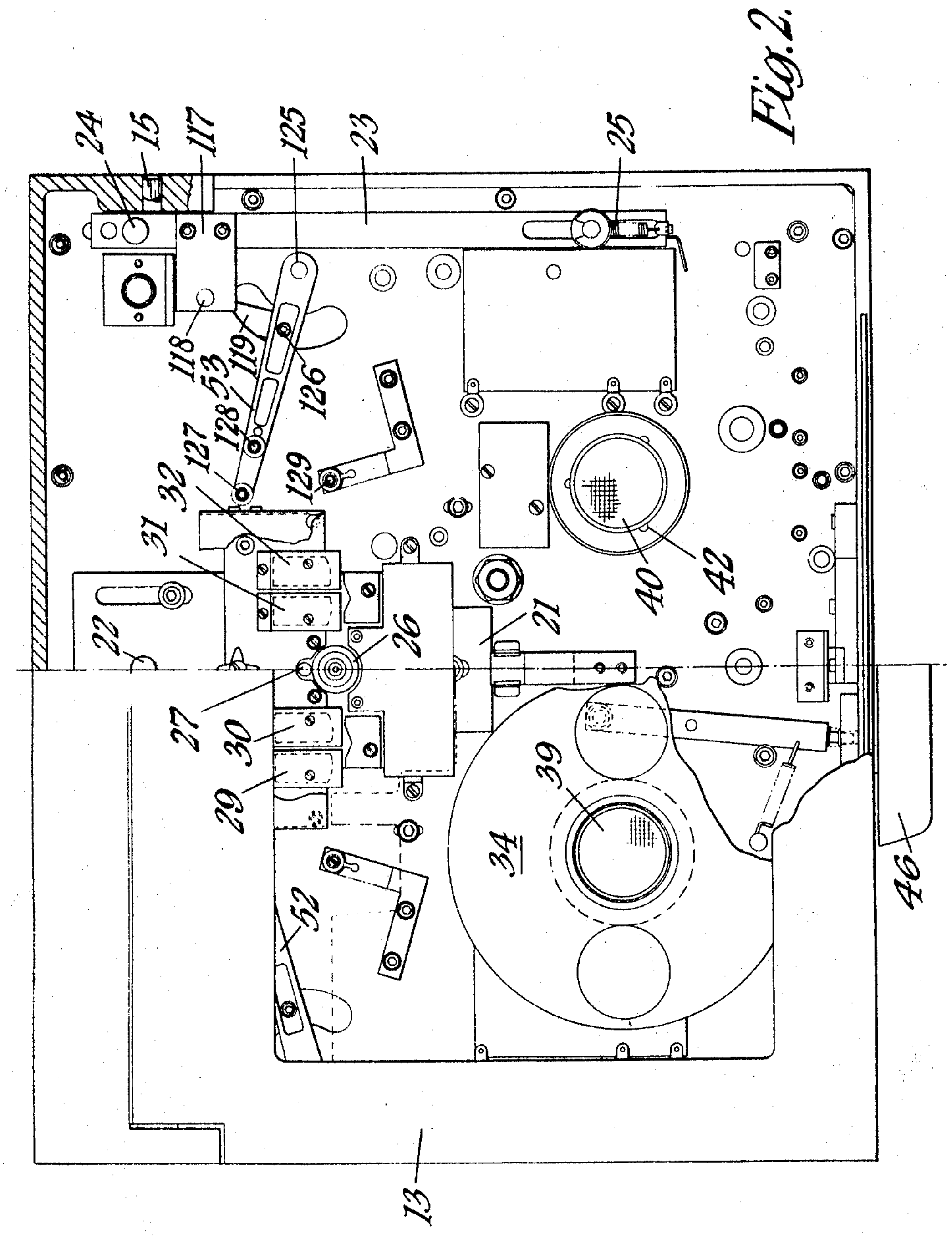
FIGURE 2 is a plan view of the recorder with a part of the lid cut away to show the interior mechanism.

FIGURE 1 shows the recorder with the lid open and the tape guide rollers and pinch roller in the disengaged positions while FIGURE 2 shows the recorder with the lid closed and the tape guide rollers and pinch roller in the tape-engaged positions. With the lid open the slides 19, 21 and 23 have been moved towards the front of the recorder (that is, to the left in FIGURE 1) and the guide arm 53 is in such a position that the movable guide rollers 127 and 128 on the guide arm 53 are approximately the same distance from the front of the recorder as the pinch roller 26. When the cassette is inserted the movable guide rollers are all on the same side of the tape. When the lid is closed the three slides are allowed to move towards the rear of the recorder under the influence of their springs. The pinch roller moves towards the capstan and presses the tape against it. At the same time the bracket 117, carried upwardly in FIGURE 2 by the slide 23, causes the swinging plate 119 to be carried bodily upwardly in FIGURE 4 and at the same time to swing around the pin 122. The bodily upward movement of the swinging plate 119 and the pin 126 swings the guide arm 53 upwardly in FIGURE 2 into the tape-engaged position shown. The action of the slide 19 is exactly the same so that the guide arm 52 is also swung into the tape-engaged position. The fixed guide roller 129 is initially on the opposite side of the tape to the movable guide rollers 127, 128 and after the lid has been closed the path of the tape from the capstan 27 and pinch roller 26 is around the curved fronts of the magnetic heads 31 and 32, around the movable roller 127, the fixed roller 129, the movable roller 128 and into the cassette.

The cassette 33 (shown in detail in FIGURES 5, 6 and 7) is of flat rectangular construction and is made of a moulded synthetic plastics material to form a shallow box with thin top and bottom panels. The top and botom panels are each provided with two openings which accommodate and lower cylindrical projections on two tape spools, one of which, 34, is shown in FIGURES 1 and 2. The recorder is provided with an upper mechanism panel or platform 35 on which the cassette is seated and when in position is located by three shouldered locating pins, two of which, respectively 36 and 37, are shown in FIGURE 1. The cassette is held in position by a pair of spring latches projecting in opposite directions through a rectangular opening extending right through the cassette, one of the latches 38 being shown, the other being close to it and having its latch portion facing in the other direction, so that the two latches engage portions of the upper surface on either side of the rectangular opening.

The cassette is also provided with two arms which are not shown and which serve to hold the spools in position when the cassette is not mounted in the recorder. These arms and the means used to retain the spools is more particularly described later with reference to FIGURES 5 through 7.

Projecting through the upper platform are two tape spool hubs, respectively, 39 and 40, which are coupled respectively to driving motors. The detailed construction of these hubs is more fully described later with reference to FIGURES 8 through 11. Each spool hub consists of a cylindrical portion 41 having the hemispherical ends of three pins 42 projecting radially therefrom. Inside each hub is a rubber ring which serves as a spring to push all the three springs outwardly. Each tape spool has a bore which fits on the diameter 41 and this bore is flared at the lower end so that the flared portion will pass over the pins 42. At the inner end of the flare is a narrow central band of the bore diameter and beyond this narrow band there is a conical recess, so arranged that when the cassette is pushed into position the heads of the pins 42 are pushed radially inwards by the flares until the pins pass over the said narrow band, and after that the pins move outwardly into the conical recess. In so doing the pins press the spools on to the hubs. Each hub is provided with a flange 43 which is faced with a friction material, such as sheet rubber, and the pressure exerted by the pins 42 presses each tape spool on to the respective flange 43 with sufficient force to provide a friction drive.

FIGURE 2 shows a plan view of the recorder with a part of the lid cut away. The capstan 27 is driven by the reversible synchronous motor 28 (FIGURE 1). The four recording heads 29, 30, 31 and 32 are shown. The pinch roller 26 mounted on its sliding platform 21 is shown in engagement with the capstan. The spool hub 39 is shown carrying the tape spool 34 while the hub 40 is shown without a spool.

Figure 3:
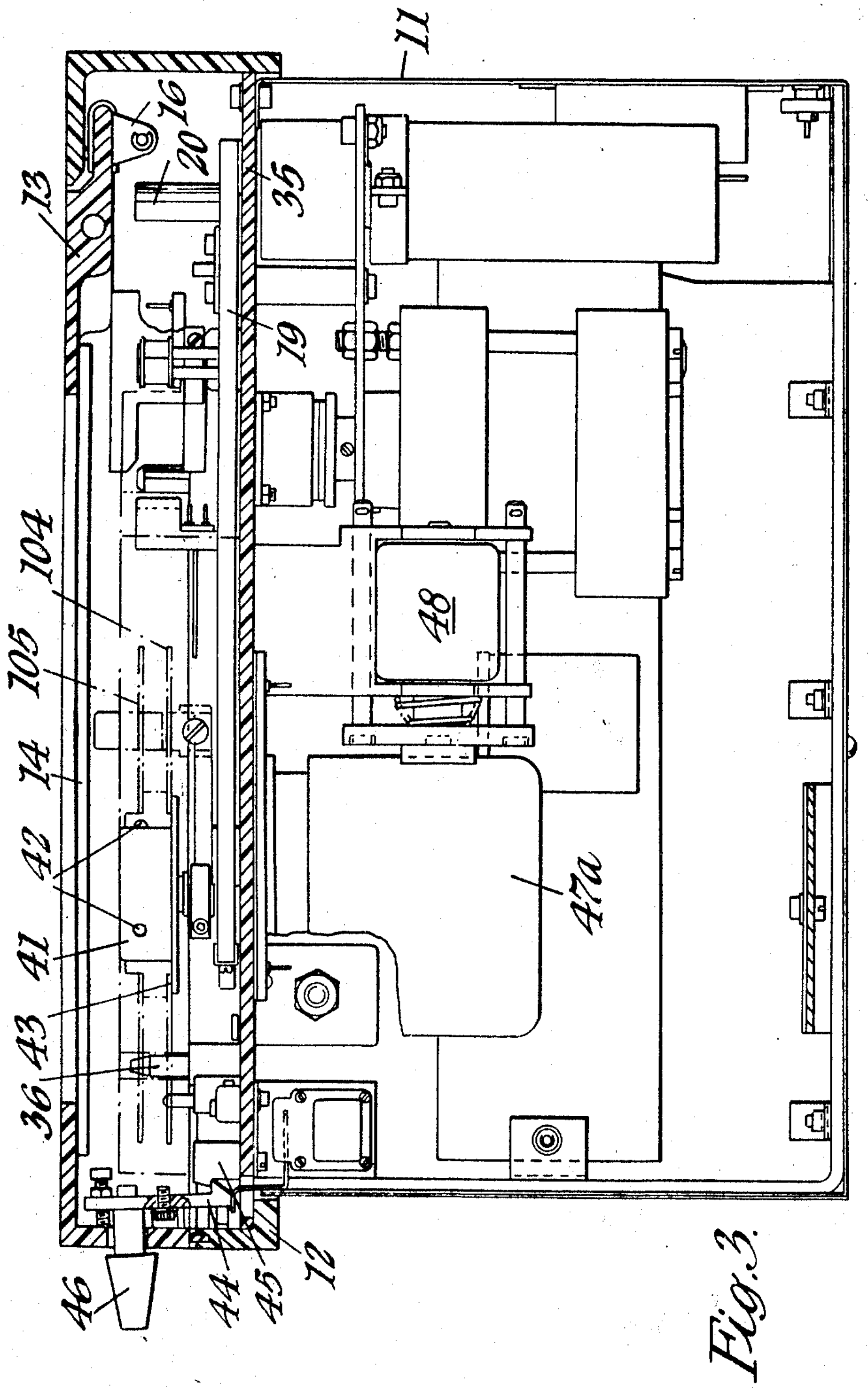
FIGURE 3 is a vertical section through the recorder from front to rear.

FIGURE 3 is a vertical section through the recorder from front to back with the lid closed. One lid bracket 16 is shown, the roller carried thereby being out of engagement with the stem 20 when the lid is closed.

The lid is maintained in its closed position by a catch 44 which engages a lipped latch 45, the catch 44 being connected to a handle 46, the weight of the handle holding the catch in a closed position. It is only necessary to press upwardly on the handle 46 to release the catch and raise the lid.

FIGURE 4 is an inverted plan view of the recorder with the bottom removed. It shows the two spool motors, respectively 46 and 47, which are of the inverted type in which the spindle is held still and what is normally the stator body revolves around the spindle. Each motor is provided with an electromatic actuator, respectively 48 and 49, which is associated with a friction brake mechanism, respectively 50 and 51. When the lid is open the two brakes are both applied by springs and the tape spool hubs are stationary. When, however, the lid is closed a switch is actuated which energizes the actuators and cause them to pull the two brakes off so that the spool motors are free to rotate. The motors are arranged to rotate in opposite directions and pull against each other to maintain tension in the tape.

Figures 5, 6, 7:
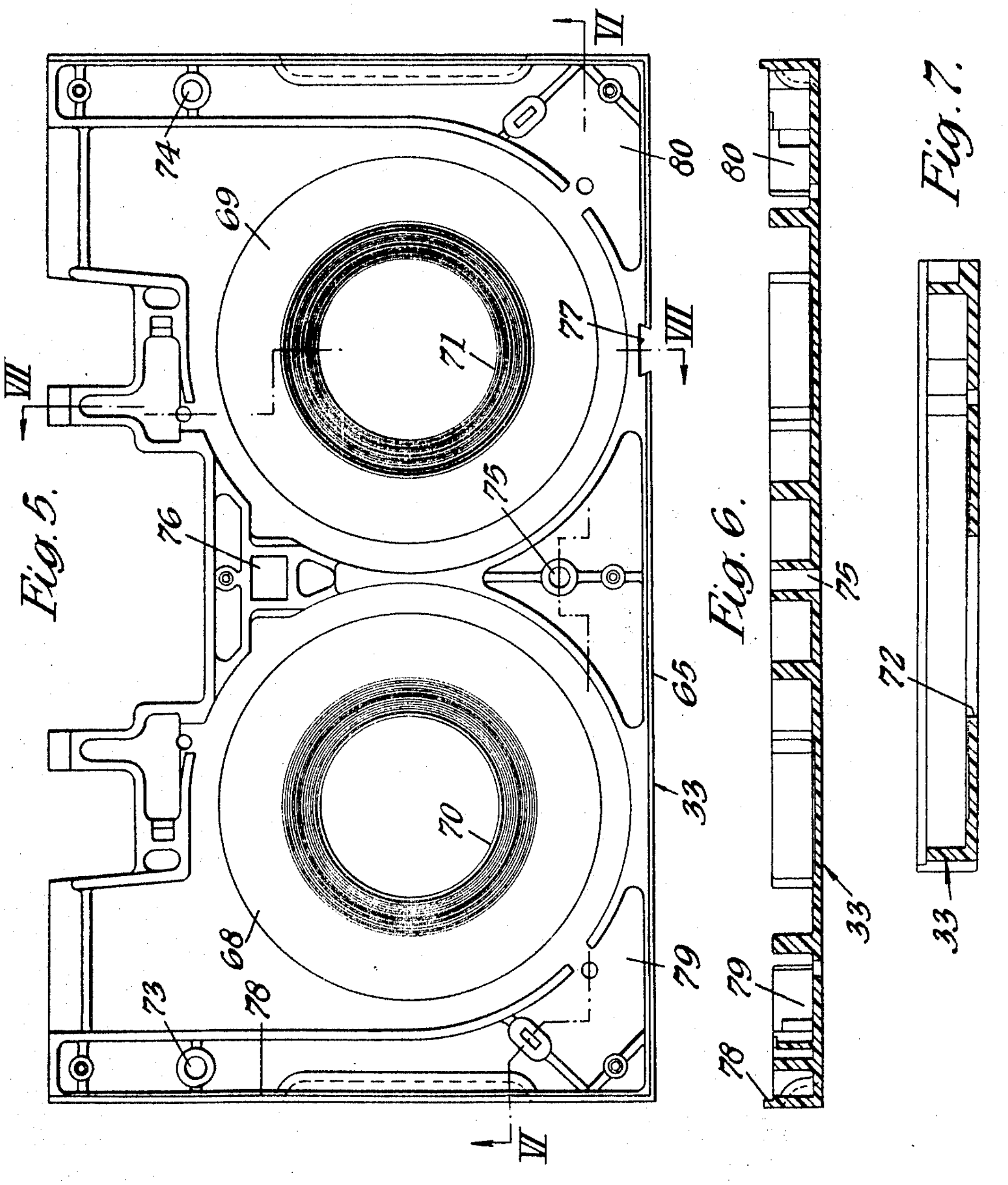
FIGURE 5 is a plan view of the cassette showing the tape spools in position and with the lid removed.
FIGURE 6 is a sectional elevation taken on the line VI—VI of FIGURE 5.
FIGURE 7 is an elevation of the casing of the cassette taken on the line VII—VII of FIGURE 5.

The cassette is shown in FIGURES 5 to 7.

As shown in these drawings, the cassette according to the invention comprises a casing of generally rectangular form and moulded from a synthetic plastics material. The casing is composed of a shallow box having three straight sides, respectively 65, 66 and 67, the fourth side being interrupted by a gap through which the tape passes from one spool to another outside the closed portion of the cassette. The top of the box is provided with a shallow recess 78 (FIGURE 2) into which a lid may be fitted. Two tape spools, respectively, 34 and 69, are contained in the cassette, each tape spool having a bore indicated respectively by references 70 and 71 which is especially formed to be engaged by the spring device in the recorder which has already been referred to. The shape of the bores 70 and 71 is described in more detail later. As already mentioned, each spool hub in the recorder is provided with a flange faced with a friction material and a projecting cylindrical portion, from which three spring-loaded pins project radially. The bore of each spool is flared at the inner end and is also provided with a circumferential recess in the bore, separated from the flared portion by a narrow band of the bore diameter, the recess having a conical portion adjacent the said narrow band. When the cassette is pressed into position the flared portions of the bores force the pins on the hubs inwardly and when the pins have passed the narrow bands they act on the conical portions of the recesses to push the spools into contact with the friction faces.

As shown in FIGURE 7, the bottom of the cassette box is provided with two apertures one of which, 72 is shown, to accommodate a shallow cylindrical projection 103*a* (shown in FIGURE 11) formed on the spool so that the spool is approximately located in its correct position when in the cassette. The lid of the cassette (not shown in the drawing) is just a flat plate and may be formed with similar apertures 72.

The box portion of the cassette is provided with three locating holes respectively 73, 74 and 75 which are engaged by shouldered locating pins already described on the mechanism platform of the recorder, the cassette resting on the shoulders of the pins when in position.

As shown in FIGURE 6, the cassette is made from a moulding of quite thin section but it has numerous ribs inside it which give it great strength despite the thin sections.

The cassette is also provided with a square opening 76 through which a pair of spring latches (the latch 38 and its companion) pass as the cassette is placed in the recorder. When the cassette is fully home on its seatings these two latches move apart to engage the upper surface of the cassette on opposite sides of the rectangular opening 76.

At the side of the cassette a dovetail-shaped groove 77 is provided into which a dovetail fin of a "write permit" plate fits. This is a flat plate (not shown) which lies along the side of the cassette and is held in position by the dovetail engagement. When this plate is in position and the cassette is inserted in the recorder the plate engages a microswitch and actuates it as the cassette is pressed in position. This switch connects the "write" amplifier so that the magnetic tape in the cassette may have matter recorded on it. Once the tape in the cassette has been recorded the "write permit" plate is removed and thereafter the power to the "write" amplifier is cut off, even with the cassette in position, so that it is impossible to record new matter over previously recorded matter and thereby to destroy the older recording.

Two arms are fitted into the cassette in the regions 79 and 80. When the cassette is free these arms each engage a flange of the adjacent spool and hold the spool against movement in the cassette. When the cassette is placed in position the arms are disengaged from the spools as the spools are engaged with their driving hubs. In this way the tape is prevented from becoming slack or tangled.

The spool mounting arrangement, including the spool hub already referred to, is shown in FIGURES 8 to 11.

Figures 8, 9, 10, 11:
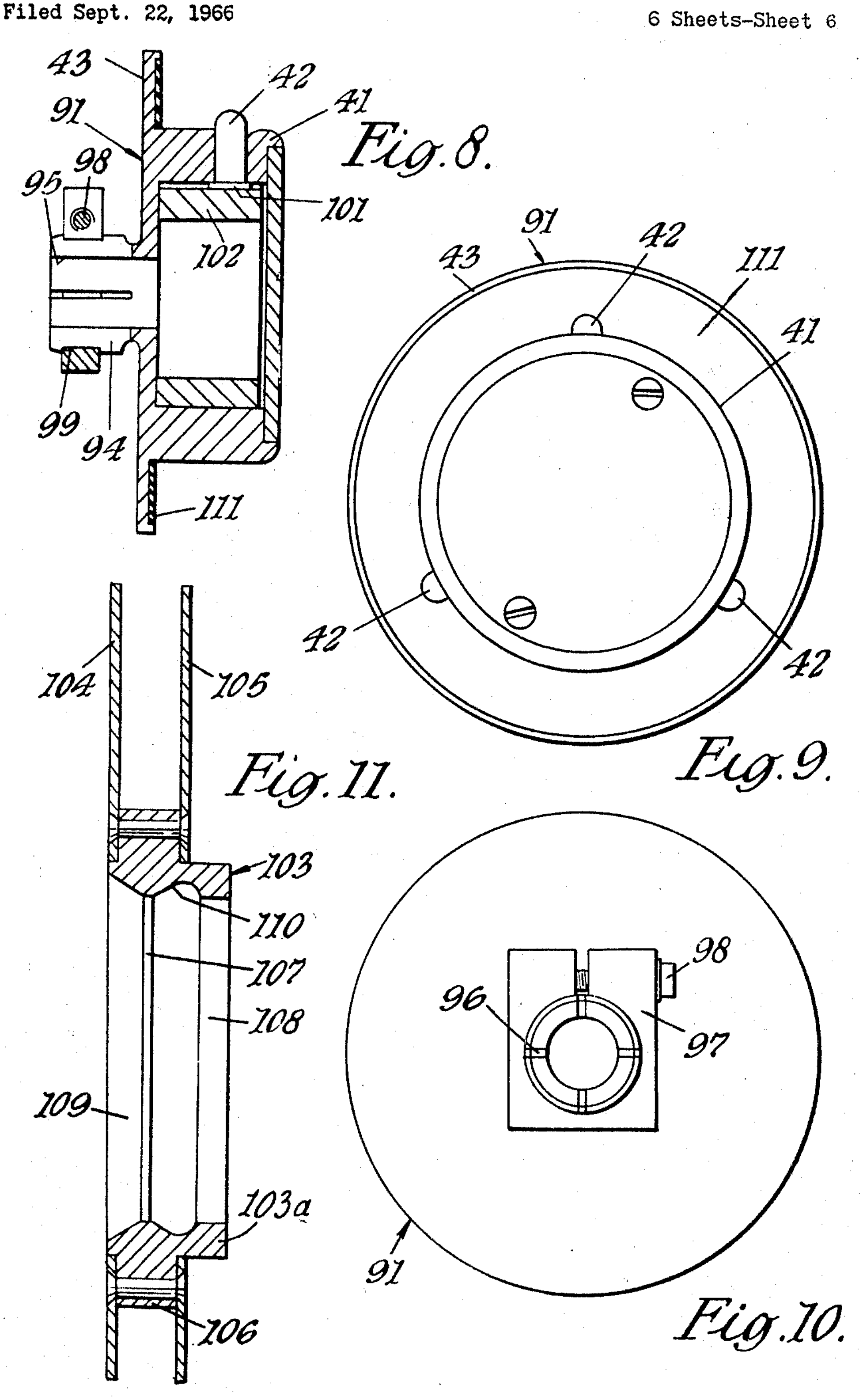
FIGURE 8 is a sectional elevation of the spool mounting hub for the tape recorder.
FIGURE 9 is a front elevation of the hub of FIGURE 8.
FIGURE 10 is a rear view of the hub of FIGURE 8.
FIGURE 11 is a section through a spool for use with the hub of FIGURES 8 to 10.

Referring to FIGURE 8, the spool hub comprises a body, generally indicated by reference 91, comprising a flange 43 and a cylindrical portion 41 projecting from the flange 43. At the rear of the flange 43 is a hollow boss 94 having a bore 95 bored to the diameter of the shaft on which the hub is to be mounted. The boss 94 has four radial saw-cuts 96 and is surrounded by a clamping block 97 provided with a clamping screw 98, the clamping block being seated in a circumferential groove 99 formed around the boss. To mount the hub it is only necessary to push the bore 95 of the boss 94 onto the shaft and then tighten up the clamping screw 98, whereupon the hub is firmly mounted.

The cylindrical portion 41 of the hub is hollow and contains three radially directed bores in its wall, through which three pins 42 project. Each of the pins 42 is provided with an enlarged head 101 at its inner end, so that it cannot disengage itself from the hub, and the outer ends of the pins 12 are of hemispherical form. Inside the bore in the cylindrical portion 41 is a rubber ring 102 which acts as a spring to push the pins 42 outwardly.

The tape spool mounted in the cassette for use with the hub shown in FIGURES 8 to 10 is shown in section in FIGURE 11. It consists of a central portion, generally indicated by reference 103, and two spool flanges, respectively 104 and 105, which are riveted onto a ring 26 formed on the central portion. The bore of the member 103 consists of a narrow band 107 and a broader band 108, both of which are bored to be a good fit on the diameter of the cylindrical portion 41. The lower end of the bore is flared out at 109 so that the larger end of the flare will pass over the projecting ends of the pins 42. Between the band 107 and the band 108 is a recess having a conical portion 110 adjacent the band 107. To fit the spool onto the hub it is only necessary to push it on with the flared portion 29 inwards. This flared portion pushes the pins 42 radially inwards until they have moved past the band 107. After that the pins move outwardly against the conical portion 110 of the bore and push the spool inwardly until the inner portion of the spool flange 104 abuts the flange 43 of the hub. Thus, the spool snaps into position and is automatically located, and in order to provide a drive for the spool the flange 43 is provided with a facing 111 of friction material, such as sheet rubber.

It is found that the friction provided by the friction material 111 against the flange 104 under the pressure provided by the pins 42 is more than adequate to provide a drive for the spool, even when a spool carrying a very wide tape is used. It will be appreciated that, provided that the bore of the spool is correctly formed dimensionally, the ring 106 may be as wide as desired, so that spools for all widths of tape may be interchangeably mounted on the spool hub. Since the friction drive provided by the facing 111 against the spool flange 104 is fully adequate, there is no need to provide keys and keyways, or splines, and there is no need for any relative rotation between the spool and its hub to allow the keys or splines to engage.

The spool mounting arrangement is therefore particularly useful in conjunction with the cassette since the two spools have to be placed on their hubs simultaneously as the cassette is placed in position.

I claim:

1. A magnetic tape recorder comprising a container having a hinged lid, a cassette, a mechanism panel in the container having means to accept the cassette, the cassette containing a pair of tape spools to carry a quantity of magnetic tape of which a short portion is outside the cassette, a pair of hubs associated with the mechanism panel on which the tape spools are automatically located when the cassette is placed in position, a spring catch which automatically holds and locates the cassette when the cassette is pressed into position on the mechanism panel, a plurality of magnetic heads, a capstan, a reversible synchronous motor to drive the capstan, three separate movable slides on the mechanism panel, springs to urge the slides into operational positions, a pinch roller carried on one of the slides for movement therewith, a pair of tape guide arms each of which carries at least one tape guide roller, means on each of the other slides to move one of the tape guide arms, means on the lid to engage and move each of the slides against its spring when the lid is opened, closure of the lid allowing the said one slide to move the pinch roller to engage the tape with the capstan and allowing the other slides to move the tape guide arms to bring the tape into contact with the magnetic heads, and two motors respectively coupled to the two hubs to drive the tape spools.

2. A recorder as claimed in claim 1 in which the means on the lid to move the slides comprises rollers mounted on the lid which swing inwardly when the lid is opened, the rollers each engaging an upstanding stem on the respective slide.

3. A recorder as claimed in claim 1 comprising a brake for each motor, spring means to apply each brake when the lid is open, an electromechanical actuator for each brake, and a contact which is closed when the lid is closed, the closure of the contact energizing the actuators to cause the brakes to be withdrawn against the spring pressure.

4. A recorder as claimed in claim 1 in which the cassette comprises a shallow box moulded of synthetic plastics material, said tape spools having cylindrical projections thereon, circular openings in the bottom of the box receiving the cylindrical projections to locate the tape spools in the box, the tape spools being bored to fit over the hubs in the recorder, locating holes in the cassette engageable by locating pins in the recorder, and a hole through the cassette which is engaged by said spring catch in the recorder when the cassette is placed in position.

5. A recorder as claimed in claim 4 in which the hole through the cassette is square in shape and said spring catch comprises two spring latches on the tape recorder which spring outwardly in opposite directions to engage the top face of the cassette on opposite sides of the hole when the cassette is in position.

6. A recorder as claimed in claim 1 in which each hub comprises a flange faced with a friction material and a cylindrical portion projecting therefrom, at least two spring-loaded pins projecting radially from the cylindrical portion, each said spool for the magnetic recording medium having a central portion with a bore to fit on the cylindrical portion of the hub, the bore being flared at its inner end to enable it to pass over the ends of the pins and force them inwardly against their spring loading, the bore also having an internal circumferential recess beyond the flared portion separated from the flared portion by a narrow band of the bore, the recess being of conical form beyond the said narrow band, so that the pins, after passing the narrow band, move outwardly against the conical portion and force the spool against the facing of friction material on the flange to provide a friction drive for the spool.

7. A recorder as claimed in claim 6 in which there are three pins projecting from the hub.

8. A recorder as claimed in claim 6 in which the spring loading for the pins is provided by a rubber ring inside the hub.

References Cited

UNITED STATES PATENTS

| | | | |
|---|---|---|---|
| 2,216,463 | 10/1940 | Steiner | 242—55.13 |
| 3,083,925 | 4/1963 | Schoebel | 242—55.13 |
| 3,167,267 | 1/1965 | Crane | 242—55.13 |
| 3,265,317 | 8/1966 | Liang et al. | 242—55.13 |
| 3,273,815 | 9/1966 | Schuller | 242—55.13 X |

GEORGE F. MAUTZ, Primary Examiner

U.S. Cl. X.R.

242—200; 274—4